Oct. 15, 1968        R. L. WEBER III        3,405,630
COFFEE MAKER

Filed Nov. 28, 1966        8 Sheets-Sheet 1

INVENTOR
ROBERT L. WEBER, III

BY
Hopgood & Calimafde
ATTORNEYS

Oct. 15, 1968  R. L. WEBER III  3,405,630
COFFEE MAKER
Filed Nov. 28, 1966  8 Sheets-Sheet 2
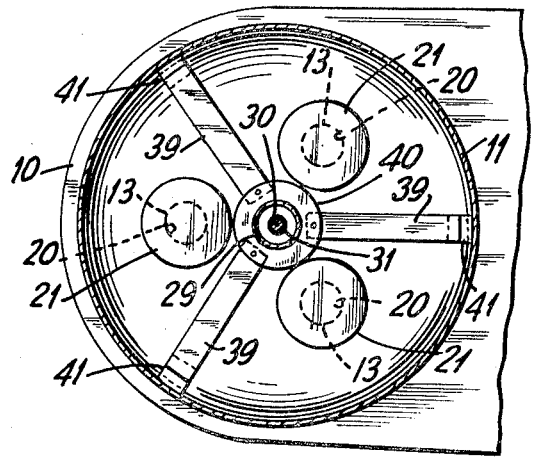
FIG.IA
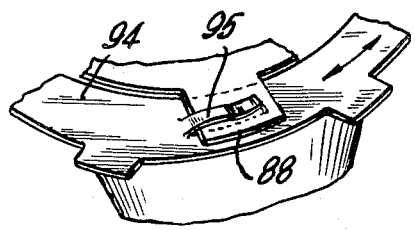
FIG.2A
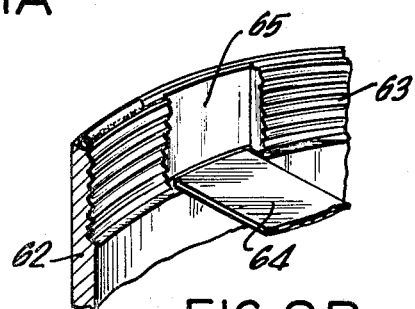
FIG.2B
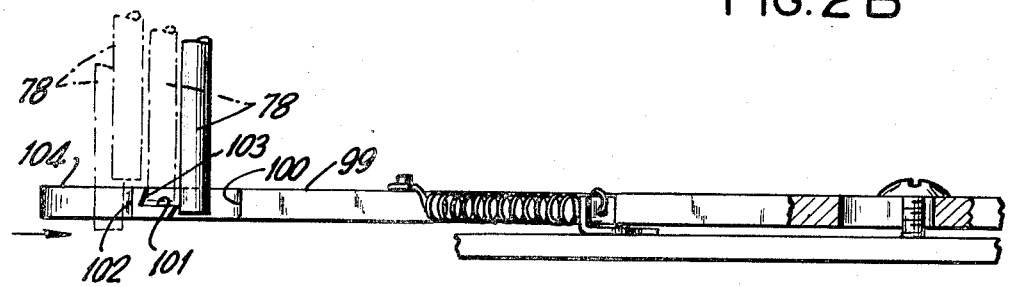
FIG.3
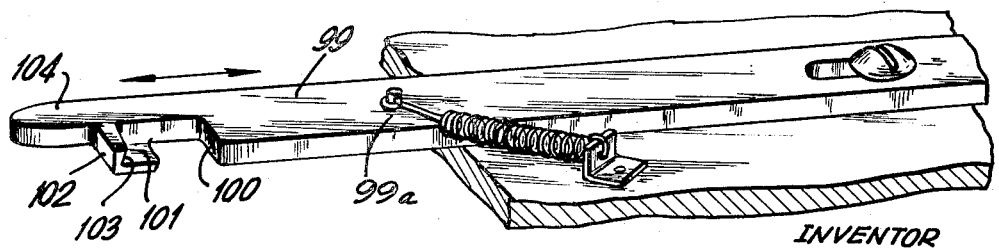
FIG.4
INVENTOR
ROBERT L. WEBER, III
BY Hopgood & Calimafde
ATTORNEYS

INVENTOR
ROBERT L. WEBER III

BY
Hopgood & Calimafde
ATTORNEYS

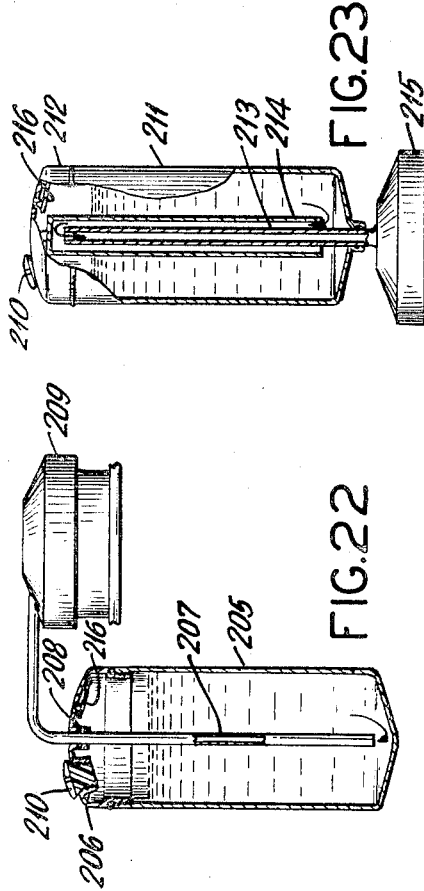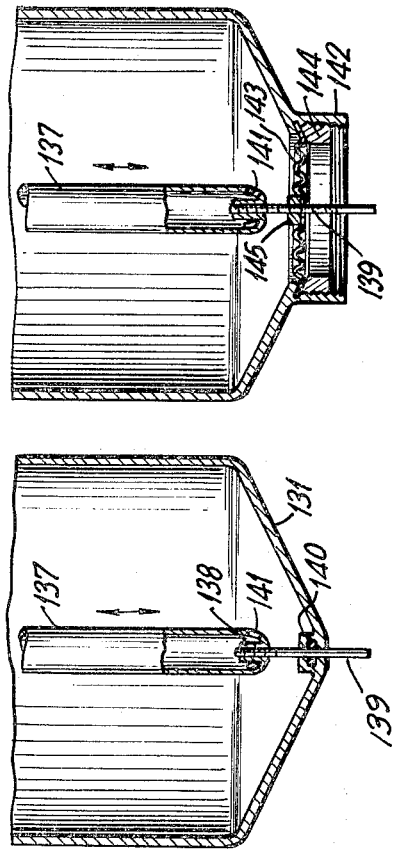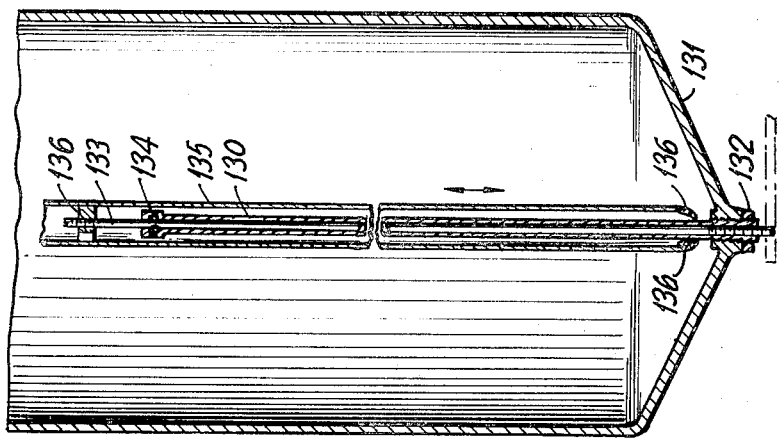

Oct. 15, 1968   R. L. WEBER III   3,405,630
COFFEE MAKER

Filed Nov. 28, 1966   8 Sheets-Sheet 7

INVENTOR
ROBERT L. WEBER, III

BY Hopgood & Calimafde
ATTORNEYS

Oct. 15, 1968 R. L. WEBER III 3,405,630
COFFEE MAKER
Filed Nov. 28, 1966 8 Sheets-Sheet 8

INVENTOR
ROBERT L. WEBER, III
BY Hopgood & Calimafde
ATTORNEYS

United States Patent Office 3,405,630
Patented Oct. 15, 1968

3,405,630
COFFEE MAKER
Robert L. Weber III, New Canaan, Conn., assignor to Scovill Manufacturing Company, Waterbury, Conn., a corporation of Connecticut
Filed Nov. 28, 1966, Ser. No. 597,265
19 Claims. (Cl. 99—282)

ABSTRACT OF THE DISCLOSURE

A coffee maker is provided comprising a water-heating vessel and a coffee infusion chamber associated therewith, the water-heating vessel having heating means disposed in heat-transfer relationship therewith. A water flow-through tube is provided within the vessel extending from the bottom thereof to the coffee infusion chamber, the lower portion of the said flow-through tube having an opening communicating with the interior of the vessel. A venting means is provided for venting the upper part of the vessel, a temperature-responsive actuating means being employed for closing the venting means, whereby the space above the water in the vessel is sealed off so that pressure build-up therein during heating causes water at a predetermined temperature to flow through the tube and into the coffee infusion chamber.

---

This invention relates to an improved coffee maker and, in particular, to coffee makers of the type where heated water is transferred from a water-heating vessel to a coffee infusion chamber at a controlled predetermined temperature.

Until as late as 1960, there were no generally accepted flavor and strength standards for coffee. Thanks to the patient and exhaustive work for the Coffee Brewing Institute, there are now carefully delineated standards against which the flavor qualities of the various coffee brews can be measured.

Today coffee drinking has evolved into an important part of our accepted social pattern; so much so that extensive research has been undertaken to determine what deep psychological references may be attached to human behavior concerning coffee drinking. This research shows that man has been concerned with coffee brewing and coffee drinking in more than just a casual way; it has become an essential part of his pattern of living.

Of the millions of words that have been written about coffee brewing and the protracted man hours devoted to the development of coffee brewing equipment, it seems incredible that many household coffee makers still fall short of being able to produce a consistently good brew according to the standards of the Coffee Brewing Institute.

Many coffee makers on the market today, whether automatic or not, boil the water just before, during or after it contacts the coffee grounds, despite the fact that one of the cardinal rules for obtaining a brew of balanced flavor and body is never to let boiling water contact the raw coffee. The ideal temperature of the water prior to contact should be 195° F., plus or minus five degrees. If a higher temperature is used, certain acids are extracted from the coffee which give the final brew a bitter taste. If a temperature below the correct range is used, then the flavor constituents will not be fully extracted resulting in what is called underdeveloped brew.

The coffee-making concept to be described herein is based on extensive research into the phenomena of coffee brewing, and provides means of controlling the essential variables to a degree not possible in present day consumer coffee makers.

In order to brew good coffee the following factors must be taken into consideration:

coffee bean quality
degree of roast
grind size and method
bulk density
cup capacity
brew chamber design
method of solvent application
time of contact between solvent and coffee water temperature
water composition
coffee/water ratio
filtration system
beverage clarity
temperature changes
holding temperature
accessibility of parts for cleaning How these requirements are held in their proper relationship is extremely important in the design of coffee-making equipment. Careful evaluation of the physical shape, size, design and component arrangement of the coffee brewing equipment itself can satisfy most of the requirements which are not directly related to the chemical process of coffee brewing. Control of the actual chemical process is made possible by a specially designed group of controls and parts and is the focal point of the total electro-mechano-chemical complex which is embodied in the improved coffee brewer described herein.

In summary, the coffee maker of the invention attempts to eliminate those sources of human error in the chemical process of brewing coffee, and by careful design of equipment incorporate all possible convenience features so that a desired blending of all electro-mechano-chemical requirements will result whereby to achieve the ultimate in coffee brewing.

It is the object of the invention to provide a coffee maker of improved construction that will operate automatically requiring the attention of the operator after it has been set for operation.

Another object is to provide a coffee maker having a water-heating vessel which is adapted to create its own pressure to force the water out of the vessel into the infusion chamber while the water is maintained at below its boiling point.

A further object is to provide an automatically operable coffee maker having an auxiliary steam compartment to provide additional pressure to augment the pressure above the water level while avoiding the boiling of the main body of the water in the vessel.

A still further object is to provide a simply constructed water-heating vessel having a thermostatically operable actuating element pre-set to feed water at a predetermined temperature to the coffee infusion chamber.

These and other objects will more clearly appear when taken in conjunction with the following description and the accompanying drawings, wherein:

FIG. 1A is a plan view of the water-heating vessel of FIG. 1 when viewed along the line 1A—1A;

FIGS. 2, 2A and 2B depict another embodiment of the coffee maker provided by the invention;

FIGS. 3 and 4 are illustrative of a stepped actuating switch which may be employed in one embodiment of the invention;

FIGS. 5, 6 and 7 depict various alternative embodiments of flow tubes which may be employed in the coffee makers of FIGS. 1 and 2;

FIGS. 22 and 23 show additional embodiments of the invention in which the flow tube is stationary.

Figure 1:
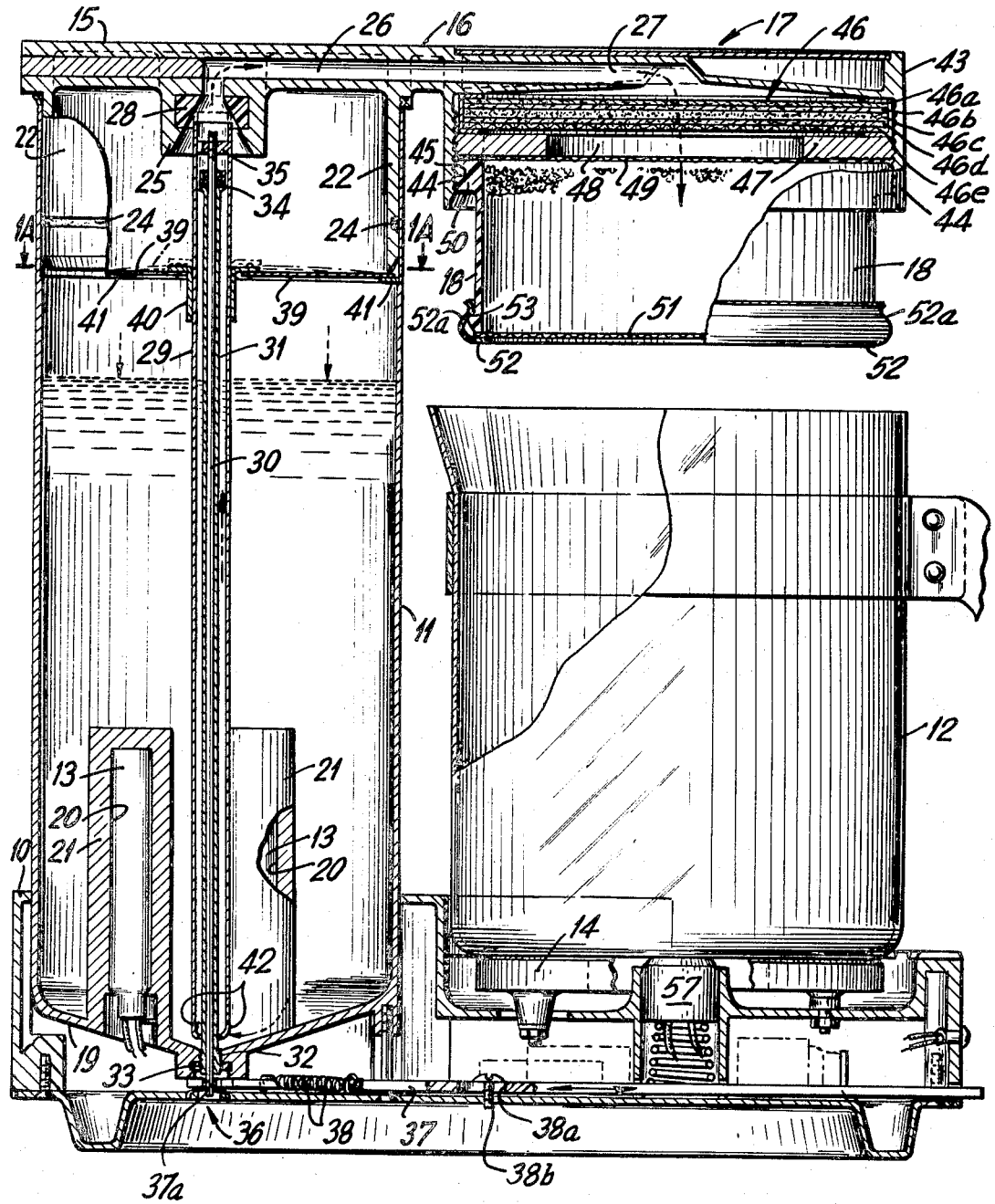
FIG. 1 is illustrative of one embodiment of the coffee maker provided by the invention.

Referring now to FIG. 1, a coffee-making pedestal 10 is shown supporting a water-heating vessel 11, and a coffee receiver 12, the pedestal having heating means 13 and 14 associated therewith for heating the vessel and the receiver, respectively. Looking at a plan view of the water-heating vessel taken along line 1A—1A, it will be noted that heater 13 comprises as one embodiment three heating elements located at 120° intervals around the vessel.

The water-heating vessel 11 has a closure element 15 sealingly connectable to the opening thereof as shown, the element having depending therefrom a bridge 16 to which is connected an infusion chamber designated generally by the numeral 17, the infusion chamber having a coffee basket 18, the details of which will be described later.

Referring again to the water-heating vessel, it will be noted that it has a closed bottom 19 having three blind chambers 20 whose walls 21 project inwardly of the vessel, each of the chambers having located therein an electrical heating element 13 connected in parallel to an electrical circuit which may be coupled via a jack to a house power line carrying, for example, 110 volts. The bottom of the vessel fits into the pedestal as shown and is supported by it. The vessel may be made of aluminum or other suitable metal. I prefer aluminum because of its realtively high heat conductivity and also because the vessel and its parts may be made by extrusion.

The vessel may be cylindrical or have any desirable shape. In the embodiment shown in FIG. 1, closure element 15 has a downwardly projecting flange 22 which fits snugly into the cylindrical vessel, the wall of the flange having an annular recess containing an O ring 24 for insuring a relatively air tight seal between the cover and the vessel.

Figure 20:
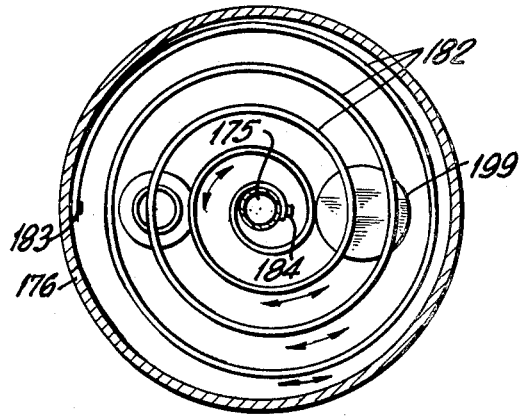
FIGS. 19 to 21 illustrate an embodiment showing another means for actuating the flow-through tube.
Figure 19:
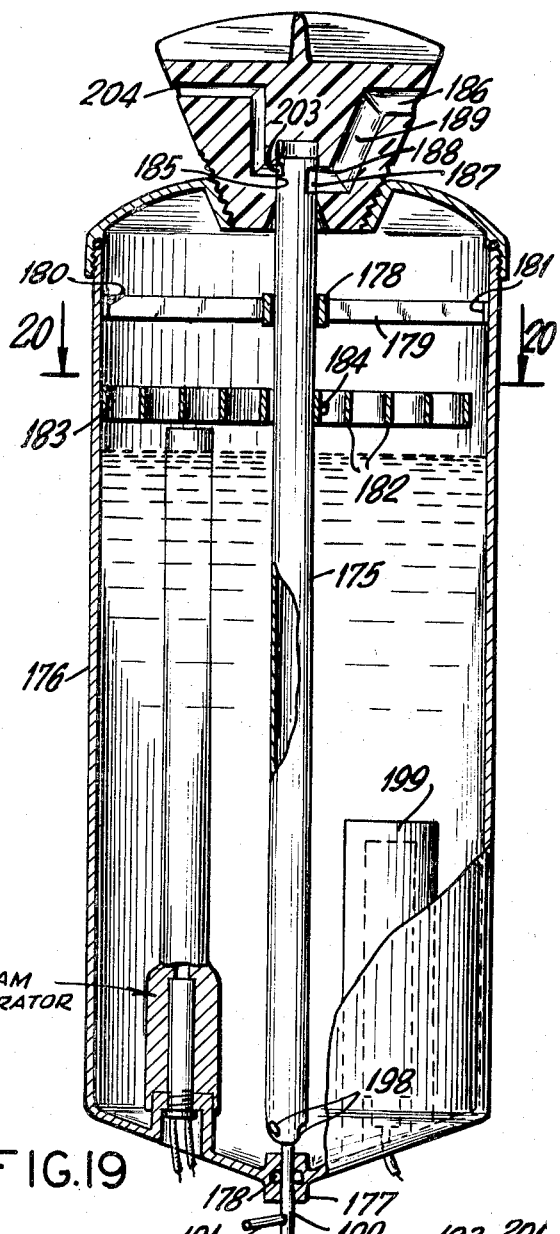
Figure 21:
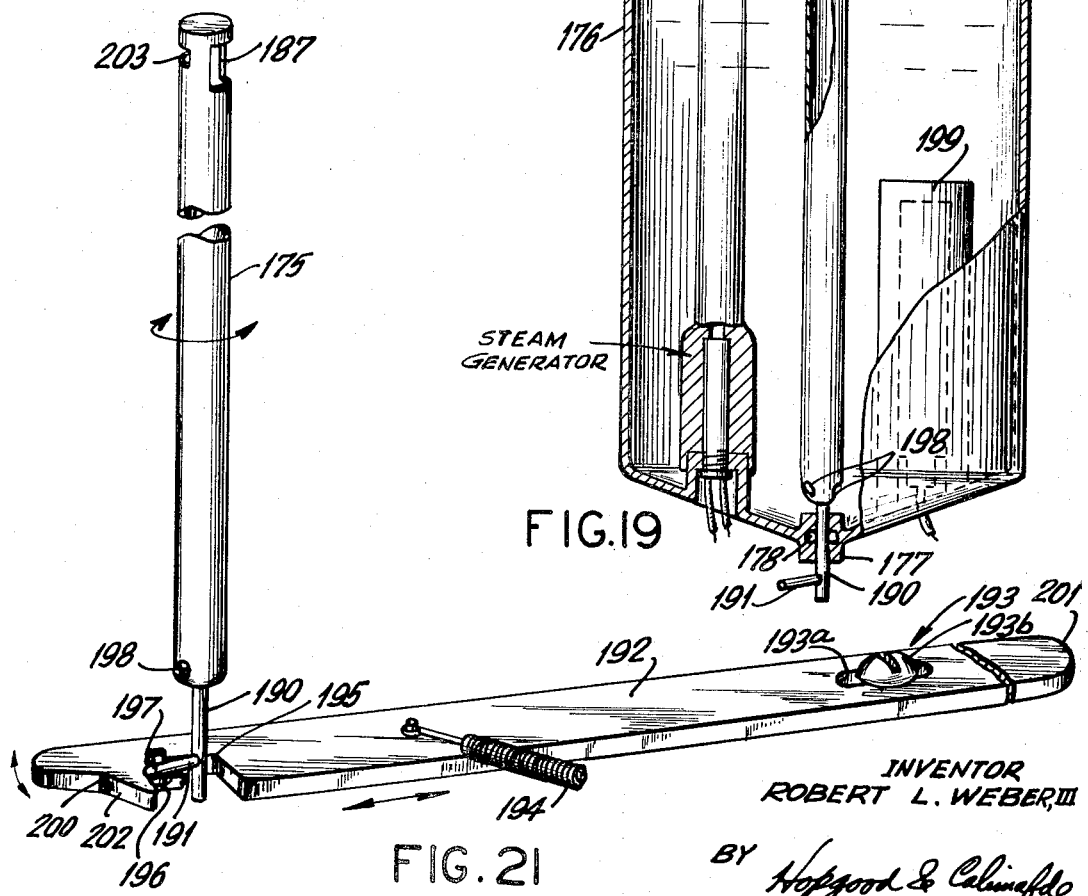

The closure element has an inwardly projecting port 25 which communicates with at least one passageway 26 located in the closure element, said passageway extending via bridge 16 to and communicating with at least one passageway 27 of infusion chamber 17 depending from the closure element. The port may be annularly recessed to receive and support a resilient seal 28, for example, an annular seal of a fluorocarbon resin, such as a material known by the trademark Teflon. The purpose of the seal is to provide sealing engagement with an upwardly movable flow-through tube 29 located substantially centrally of said water-heating vessel. Other types of movable flow-through tubes may be employed. For example, a tube that rotates may be employed to achieve the same result (FIGS. 19 to 21).

In the embodiment shown in FIG. 1, the flow-through tube, which may be made of aluminum, stainless steel, Monel metal, or other suitable metal, is supported within the vessel by means of a rod 30 and sleeves 31, concentrically located within the flow-through tube. The sleeve 31, which may be made of stainless steel, has a threaded end 32 which is threaded through the bottom of the vessel and is additionally locked in position via lock nut 33. Rod 30 is slidably mounted within the sleeve, the sleeve being flanged outward at the top 34 to provide room for an O ring to insure sealing and sliding contact with the rod. A lug 35 is provided at the top of the flow-through tube 29 at its inner wall, the lug having a threaded hole for receiving and anchoring the rod. Thus, as will be apparent, the flow-through tube is floatingly supported by the fixed sleeve, that is it is movably mounted, the rod 30 extending through the bottom of the vessel to a position 36, at which position it is capable of being coupled to a slidably mounted switch 37 via a detent or hook 37a therein, the switch being biased to an off position by means of a biasing spring 38. A slide pivot is provided comprising a slot 38a and pivot screw 38b.

The flow-through tube is further centrally supported by means of a radially extending three-legged bi-metal spring 39 (note also FIG. 1A) which is adjustably mounted to the periphery of the tube via a mounting sleeve 40 at the upper portion of the tube. The legs of the bi-metal spring extend to the inner diameter of the vessel and is supported at the tip thereof by an annular ledge 41. The bi-metal means which is thermostatically predetermined to bulge upward at a specified temperature range (e.g., at 195° F. plus or minus 5°) causes the tube to move upward of, for example, one-eighth or three-sixteenths of an inch and make sealing contact with seal 28 of port 25.

When this occurs, the air space above the water which has been heated to about 195° F. is sealed off, thereby enabling pressure to build up against the surface of the water.

The flow-through tube is provided with an opening 42 at its bottom to enable water under pressure to flow up through the tube, then through the passageways 26 and 27 into infusion chamber 17. The infusion chamber comprises a cover 43 (FIG. 1) in which at least one passageway 27 is located, the cover having a downwardly projecting flange 44 internally threaded at 45. The cover is designed to receive a water filter 46 in the form of a disc, the disc being held in position by means of an annular retaining ring 47 which is externally threaded so that it can be threaded into the opening of the cover. The ring has a sufficient thickness to provide an air trap 48 as shown in FIG. 1 to minimize coffee back-up into the filter. A seive 49 is provided made, for example, of fine wire mesh of stainless steel or fine mesh nylon, or the like, adjacent the retainer ring, the coffee basket being screwed into position via an externally threaded flange 50. In the embodiment shown, the bottom of the basket in use is provided with a coffee filter paper 51 and a perforated disc-shaped spring clip 52 of stainless steel, or other material having a bent flange 52a adapted to springingly engage annular shoulder 53 at the bottom of the basket.

Figure 18:
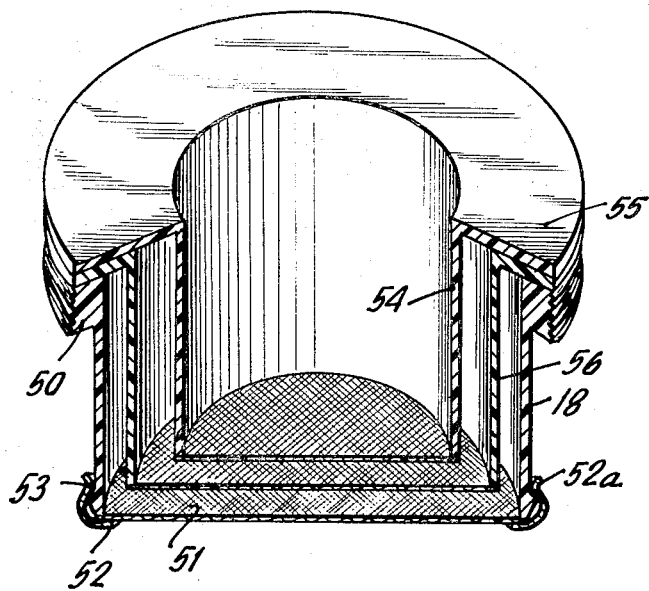
FIG. 18 is a three-dimensional representation partially broken away of coffee measuring inserts which may be employed in combination with the coffee basket.

Shown in FIG. 18 are various sized annular adapters or inserts for insuring the correct amount of coffee to water ratio and also to insure a correct depth of the coffee bed, a depth of about one inch being most desirable. Thus, if two cups of coffee are desired, insert 54 would be employed, the insert having a horizontally extending flange 55 which extends to the inner diameter of the cover. Water fed to the basket will only pass through the 2-cup insert. A 4-cup insert is designated by numeral 56 and is similarly flanged, while the basket itself without the inserts is adapted to provide six cups of coffee. However, it will be appreciated that any size basket may be employed depending upon the maximum capacity of the water-heating vessel.

Figure 13:
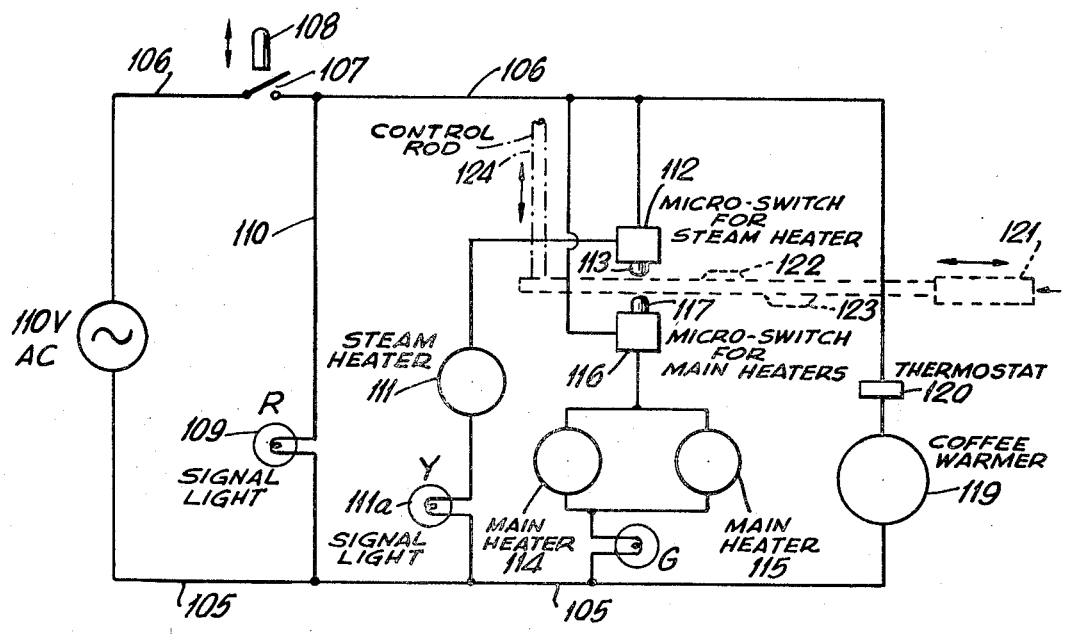
FIGS. 13 to 16 show the circuit diagram and the sequential operation of the switch means by which automatic control of the coffee maker is effected.

Coffee produced in the basket is received in coffee receiver 12 where it is maintained at the desired temperature within the range of about 160–170° F. by means of an annular heating element 14 which is thermostatically controlled by means of thermostat 57 which is adapted to cut in or cut out the heater depending on the temperature of the coffee in the receiver (note FIG. 13).

The water filter is an important consideration in producing coffee having the desired flavor since it is known that water composition may adversely affect coffee flavor. As another embodiment of my invention, I provide in combination with the coffee maker a filter 46 constructed of material adapted to remove colloidal dispersions, bad taste and odors including chlorine, from the heated water before it contacts the coffee grounds. The filter there shown may comprise two porous layers 46a, 46b of fibrous material, such as a non-woven random array of synthetic fibers, such as fibers or filaments of nylon, polypropylene or animal fibers, or the like. The first layer is preferably more porous than the second layer, the two layers combined being in the neighborhood of one-eighth of an inch. Following these two layers, a layer of activated carbon 46c is provided of about one-quarter to three-eights of an inch thick followed by a layer 46d of randomly oriented non-woven synthetic fibers which in turn is supported by a fine mesh screen of a suitable material, such as nylon, stainless steel, Monel metal or other material inert to substances in the water.

As shown in FIG. 1, the thermostatically operable bi-metal attached to the flow tube is preferably above the liquid level. It is heated by contact with the vapors coming off the surface of the liquid. Generally speaking, the temperature of the vapors above the liquid will be close to that of the body of the liquid. Assuming that a water temperature of 195° F. is desired, the bi-metal is constructed to expand the proper amount at about that temperature, thereby causing the flow tube to move upward, release the switch coupled to the downwardly extending rod 30 at 36, followed by cutting off the heaters. The filter also prevents turbidity in the brewed coffee caused by fine dust, silt and other matter generally prevalent in water by filtering out such matter before the water passes into and through the coffee basket. For my purposes, I have found that the filter described above is extremely efficient in purifying and removing bad taste and odors from the water before it reaches the coffee basket.

Figure 2:
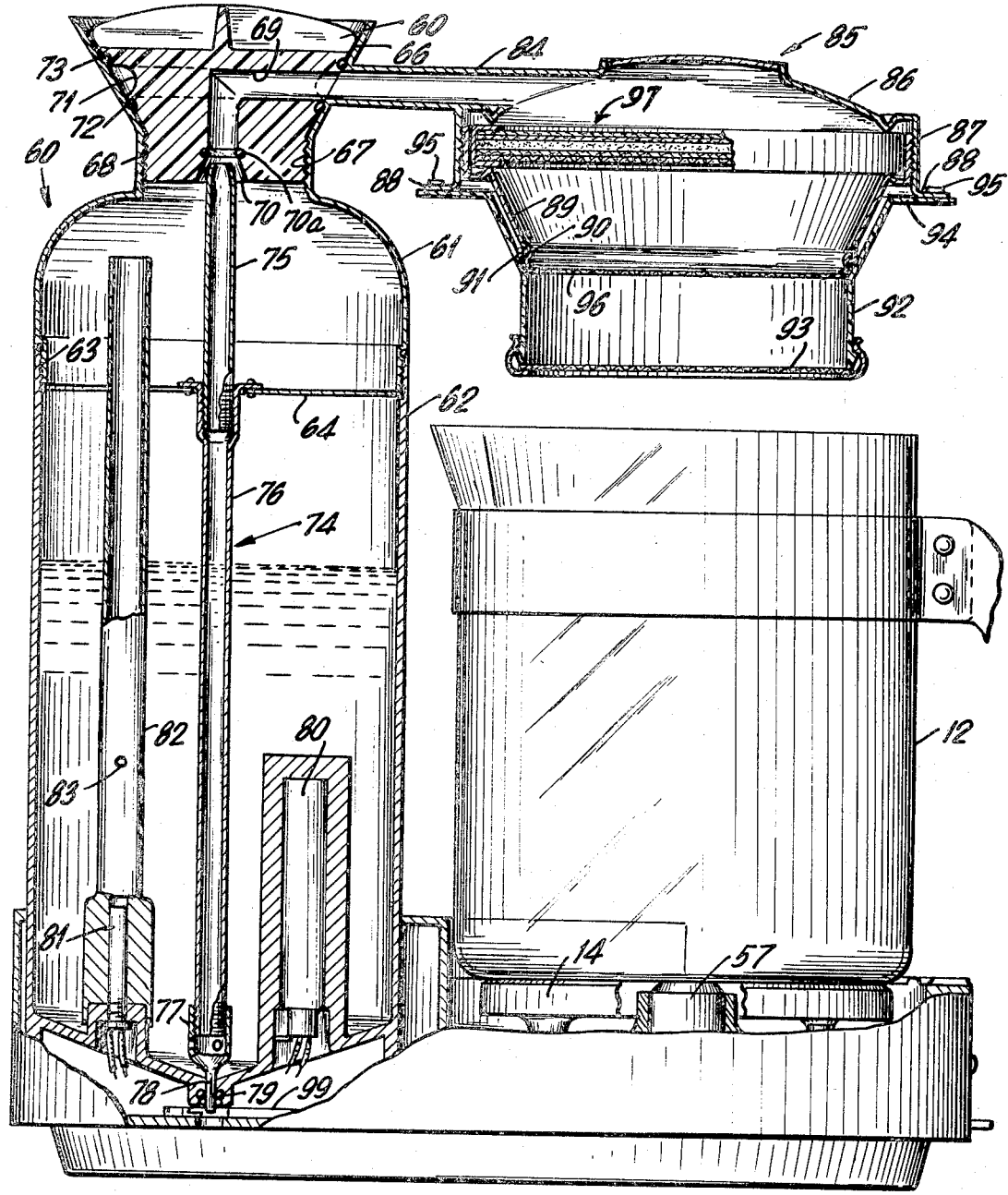

FIG. 2 is illustrative of another embodiment provided by my invention. There I show a water-heating vessel designated generally by the numeral 60 comprising an upper portion 61 and a lower portion 62, the upper portion being coupled to the lower portion by male and female threads at 63, the lower portion being recessed at three–120° spaces 65 for receiving the end of each of the bi-metal legs 64 (note FIG. 2B). Threaded to the upper portion of the vessel is a stopper or closure element 66 of phenolic resin or other suitable material. The opening of the vessel at the upper portion is cone or funnel shaped at 66 to receive the stopper which is similarly shaped, the opening being internally threaded at 67 to receive complementary threads 68 in the stopper. As will be noted, the stopper is provided with a passageway 69 which communicates with the interior of vessel 60 via port 70 which is provided with a resilient O ring seal 70a. In addition, the stopper is peripherally recessed at 71 to provide additional passageways, the recess being sealed off by O rings 72 and 73 on each side thereof.

The flow tube which is designated generally by the numeral 74 is formed of a top portion 75 screw fitted to portion 76 at the junction of the radially extending bi-metal legs 64. The bottom of the flow tube is screw fitted to portion 77 which has a reduced end portion 78 passing through the bottom of the vessel through O ring seal 79 to insure a water tight fit. As in the case of the extending rod portion 36 of FIG. 1, the reduced end portion 78 of FIG. 2 is similarly coupled to a slidably mounted switch to be later described.

Extending into the bottom of vessel 60 are three heaters comprising two main heaters 80 (only one is shown) and a high temperature heater 81 for producing instant steam, which heater is disposed within a steam tube 82 which extends the length of the vessel. The steam tube has an opening 83 into which water from the vessel flows to provide a small amount of water for immediate conversion into steam, the steam being employed to augment the pressure above the water level to insure expulsion of the water through the flow tube. However, to minimize heat transfer from the wall of the steam tube to the water outside the tube, the switch which controls the heating is indexed with stops so that only main heaters 80 are on during the waterheating cycle. As soon as the water has reached the desired temperature and flow tube 74 has moved upwardly and contacted seal 70a of port 70, the switch is released to cut off the main heaters and caused to move to a second indexed position to cut in the high temperature heater to produce steam. The manner in which this is done will be discussed relative to FIGS. 3, 4 and 13 to 16.

As in FIG. 1, passageway 69 of vessel 60 of FIG. 2 is coupled via bridge 84 to infusion chamber 85 comprising a cover 86 with a threaded side flange 87 having extending therefrom spaced fingers 88 for coupling the coffee basket thereto. As will be noted from FIG. 2, a funnel shaped portion 89 is also provided as part of the infusion chamber, the funnel portion having a threaded side flange for threading into the cover as shown. The funnel portion has an annular shoulder 90 adapted to receive O ring 91 to provide sealing engagement with coffee basket 92 having a perforated bottom 93 supporting a coffee filter material and an outwardly projecting flange 94. The flat periphery of the flange is provided with spaced spring clips 95 for gripping finger 88 (note FIG. 2A) of the cover. By turning the basket a quarter turn, it is fixed in place via the gripping fingers. As will be noted from FIG. 2, a sieve is provided above the coffee grounds. The filter 97 is supported within the cover by means of the flange of funnel shaped member 89 whereby to provide an air trap space between the filter and the basket. A receiver 12 is shown located below the infusion chamber, the receiver resting on heating means shown schematically in FIG. 2.

To understand the operation of the embodiment of FIG. 2, and the manner in which the steam tube is actuated separate and distinct from main heaters 80, reference is made to FIGS. 3 and 4 which illustrate a portion of a slidably operable actuating switch 99 of the type 37 shown in FIG. 1. As in FIG. 1, the switch has a detent 100. In addition, the detent includes a step 101. A camming surface 102 is provided for re-setting the switch.

Referring to FIG. 3, reduced section or rod extension 78 of flow tube 74 is shown disposed in the space provided by the detent. This represents the lowest position of the flow tube extension which is the position at which the main heaters are turned on. As the water and vapor temperature rises, the bi-metal begins to bulge causing the flow tube and its extension to move upward. When the temperature of say 195° F. is reached, the extension 78 will have reached the level of step 101, while the top of tube 74 starts to make contact with O rings 70a. The moment extension 78 clears the step, switch 99 which is spring biased at 99a to the right (note also biasing spring 38 in FIG. 1) moves until it catches extension 78 against face 103 (FIG. 3). With this movement, main heaters 80 are cut out while steam heater 81 is actuated. By this time, sufficient internal pressure has developed whereby water is being pushed out through the flow tube. However, to augment the pressure, steam is generated in tube 82 and rises to the space above the liquid level. The flow tube continues to rise until its extension clears the top 104 of the switch arm at which point the switch is biased in the home position and shuts off the steam heater.

Figure 14:
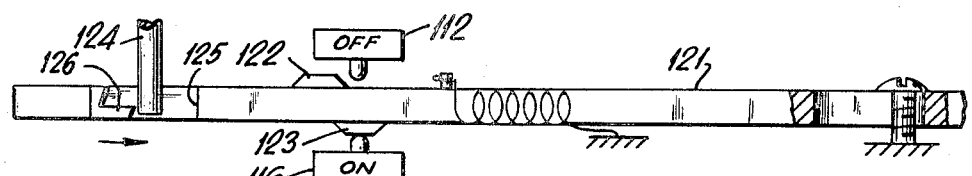
Figure 15:
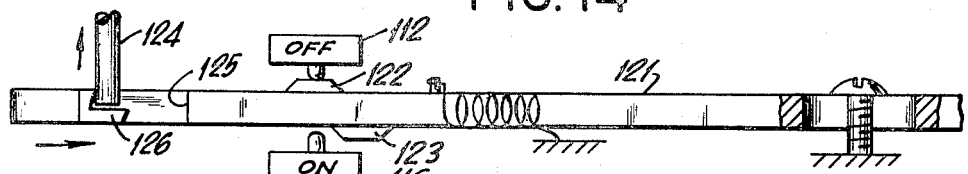
Figure 16:
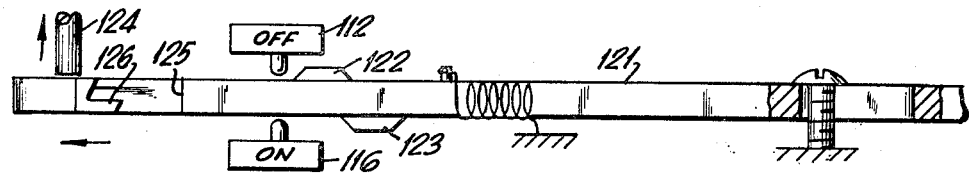

The circuit diagram is shown in FIG. 13 and the steps illustrating the various positions of the switch are shown in FIGS. 14 to 16. In each of the FIGS. 14 to 16, a spring biases the slidable switch means to the right, while in FIG. 13, a spring (not shown) biases the slidable switch means 121 to the right.

In FIG. 13, the circuit is shown coupled to main lines 105, 106, line 106 having a main switch 107 in series therewith operable via a push button 108. A main switch light 109 is provided in line 110, preferably a red light, to indicate when the power is on. Coupled across lines 105 and 106 is a steam heater 111 having in series therewith a micro switch 112 having a button 113 biased in the off position. A yellow indicating light 111a is also provided to indicate when the steam cycle is on.

Similarly a pair of main heaters 114, 115 is provided coupled in parallel across lines 105, 106, said group of main heaters having in series therewith a micro switch 116 having a button 117 also biased in the open position.

Additionally, a green indicating light 118 is provided to indicate when the water-heating cycle is on. Also coupled across the power line is a coffee warming heater 119 having in series therewith a thermostat for controlling the coffee in the receiver at a desired temperature.

Shown in phantom in FIG. 13 is a slidable actuating switch 121 which is spring biased (not shown) to the right extending between micro switches 112 and 116. The switch is provided with a pair of stops 122, 123 for actuating the respective micro switches. As switch 121 is pushed clearly to the left, stop 122 momentarily activates micro switch 112 clears it until stop 123 contacts button 117 of micro switch 116. When this position is reached, control rod 124 which is connected to flow-through tube 29 or 74 of FIGS. 1 and 2, respectively, drops into and past detent 125 shown in FIG. 14 whereby to hold micro switch 116 in the on position, thus activating main heaters 114 and 115 and green signal light 118. As the water begins to heat up and reach a predetermined temperature of say 195° F., bi-metal means 39 or 64 of FIGS. 1 and 2, respectively, begin to bulge and raise control rod 124 to the position corresponding to step 126 (FIG. 15). When this position is reached, slidable switch 121 retracts to the position shown in FIG. 15 freeing micro switch 116 and depressing micro switch 112 corresponding to steam heater 111. Steam is immediately formed in tube 82 shown in FIG. 2 causing additional pressure to build up to augment the pressure already building up in the hot water vessel. The control rod continues to rise as the bi-metal continues to bulge until it reaches the position shown in FIG. 16. By this time the slidable contact is completely released and retracts to home position thereby breaking contact on micro switch 112 and shutting off the steam heater. Meanwhile, the hot water has been forced through the flow tube into the infusion chamber and the brewed coffee collected in the receiver where it is kept at a controlled temperature via thermostatically operable heater 119. After the coffee receiver is removed, main switch 107 may be released by pressing button 108.

As will be readily apparent, various types of flow tube assemblies may be employed as shown in FIGS. 5 to 7. In FIG. 5, a fixed sleeve 130 is shown threaded through the bottom portion 131 of the water-heating vessel and held fast by a lock nut 132. Slidably mounted within the sleeve is control rod 133 which is sealed tight to the sleeve via O ring 134 located in an annular recess of the sleeve. The top of the control rod is coupled to flow through tube 135 by being threaded and screwed in the hub of radially extending arms 136 which are integral with the inner wall of tube 135. The tube is freely open at the bottom 136 to enable water to rise through it under hydrostatic pressure.

In the embodiment shown in FIG. 6, flow tube 137 has an inwardly projecting flange 138 which is threaded and has in threading engagement therewith a control rod extension 139 which extends through the bottom portion 131 of the vessel, O ring 140 being provided to maintain a water tight seal. An opening 141 is provided at the bottom of the tube to enable water to pass through it.

FIG. 7 shows another embodiment similar to FIG. 6 except that the control rod 139 which is threadingly attached to the flow tube as shown is connected to the bottom of the vessel via a flexible diaphragm. The bottom of the vessel has a downwardly extending flange 142 which is internally threaded. The diaphragm 143 is corrugated to give it a desired amount of yieldability, the diaphragm being fixed in position by lock nut 144. The control rod passes axially through the diaphragm and is tightly fixed thereto by means of lock nut 145. As in FIG. 6 an opening 141 is provided in flow-through tube 137. As the tube moves upwardly, the diaphragm will yield with it and raise the control rod accordingly.

As will be also appreciated, various types of seating embodiments may be employed in effecting a seal between the top of the flow-through tube and the part in the closure element or stopper of the water-heating vessel. Examples of such additional embodiments are depicted in FIGS. 8 to 12.

Figure 8:
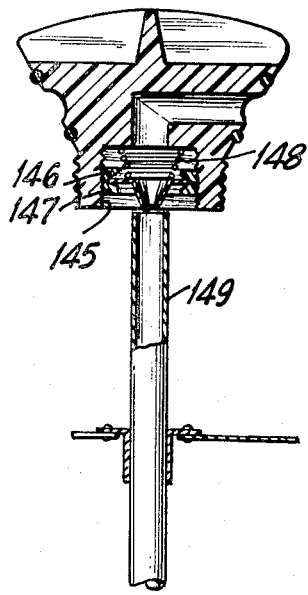
FIGS. 8 to 12 illustrate various embodiments for effecting sealing contact between the port of the closure element of the water-heating vessel and the flow-through tube of the vessel.

Referring to FIG. 8, a type of annular conical seal of Teflon is shown positioned within an internally threaded flanged port 145, the seal being held in position by a pair of lock nuts 146, 147 and being also biased outwardly by means of biasing spring 148. The tip of the conical portion of the seal has a slightly smaller diameter than flow-through tube 149, such that when the tube moves upwardly, the conical portion of the seal makes a tight seal with the internal wall of the tube.

Figure 9:
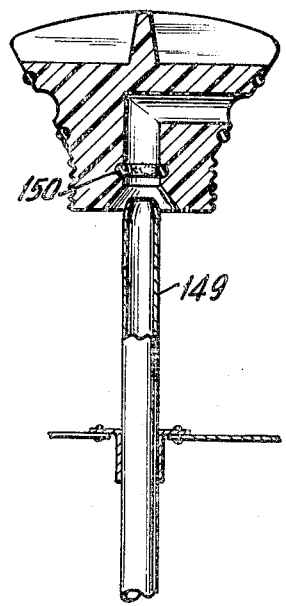

In FIG. 9, the port has an O ring 150 fixed to an annular recess, the flow-through tube 149 being dimensioned to sealingly engage the O ring.

Figure 10:
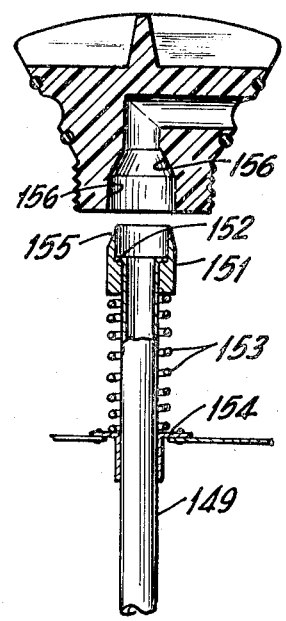

The embodiment of FIG. 10 utilizes a flow-through tube having a spring loaded cylindrical Teflon seal 151 mounted as shown, the end of the tube 149 being flanged over at 152, a spring 153 being provided supported in spring-loaded condition via annular shoulder 154 fixed to the outer surface of the tube. The seal is provided with a bevel 155 enabling it to enter port 156 in sealing engagement therewith. As the tube enters the port and makes sealing contact, the spring is advantageous in providing take-up. As the tube recedes downward, the spring pushes the seal back to its home position.

Figure 11:
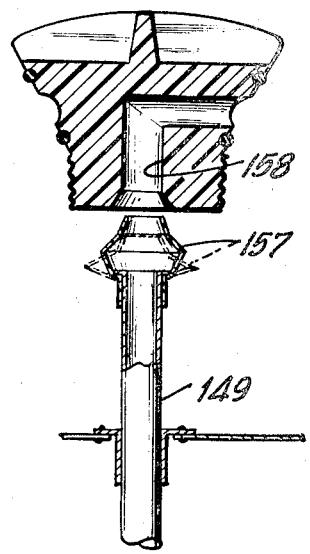

In FIG. 11 the seal there shown on the tube is shaped as a three-dimensional bellow-type diaphragm 157 having an upwardly extending conical portion for entering port 158.

Figure 12:
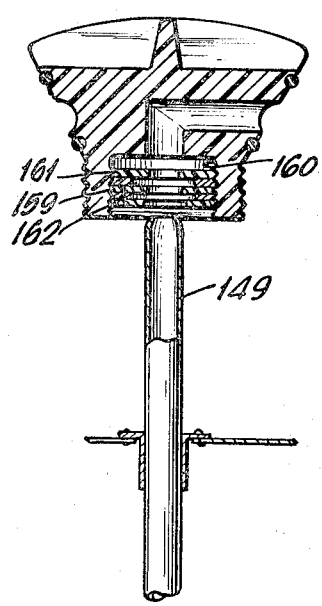

FIG. 12 discloses the use of a series of Teflon washers 159 of various sizes stacked together with spacers in between the washers, the stack being held within internally threaded port 160 by means of lock nuts 161 and 162. The Teflon washers are sized to provide a conical contour whereby to effect gradual sealing contact as the flow tube enters the port opening.

Figure 17:
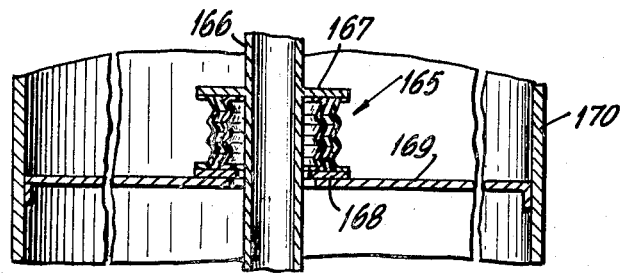
FIG. 17 depicts another embodiment of a thermostatically operable actuating element.

While it is preferred to use bi-metal means to thermostatically actuate the flow tube in the upwardly direction, it will be appreciated that other means may be employed such as a Bourdon tube or similar pneumatically operable thermostatic element. For example, an annular bellows type of corrugated element may be employed such as shown in FIG. 17 and designated generally by the numeral 165. There the thermostatic element for actuating tube 166 is double walled and hermetically sealed at both ends to flat annular rings 167, 168, ring 167 being fixed to the periphery of the tube while ring 168 is supported upon radially extending members 169 attached to the inside wall of vessel 170, the radially extending member terminating short of the centrally located tube 166. As the thermostatic element heats up, it increases in height, thereby moving tubes 166 in the upwardly direction.

While the movably mounted flow-through tube has been described as one that moves upwardly to communicate with the port in the closure element, another method of achieving communication is to provide a side opening at the top of the flow tube which is caused to index by rotation with a side opening in the port of the closure element as shown in FIGS. 19 to 21.

In FIG. 19, the flow-through tube 175 is shown supported within water-heating vessel 176 by means of a bushing 177 with O ring 178 located at the bottom of the vessel and by means of a centrally supported ring 178a at the top of the vessel, said ring being supported by arms 179 extending radially from the inner periphery of the vessel as from fixed positions 180 and 181.

In this instance, the thermostatically operable actuating means for the flow-through tube is a bi-metal spiral 182 (FIG. 20), one end of which is anchored to the vessel at 183, the other end of which is anchored to the flow-through tube 175 at 184. Since on heating the spiral tends to unreel itself, a rotational motion is applied to the flow-through tube. In FIG. 19, the flow-through tube is shown extending into port 185 of closure element 186, the tube having a side opening 187 which on rotation of the tube will index with opening 188 in the side wall of port 18, the opening 188 in turn communicating with passageway 189 in the closure element.

A rod extension 190 is provided at the end of the tube having a lever arm 191 for cooperating with means on actuating switch 192 shown in FIG. 21. The switch shown is slidably and pivotally mounted at 193 and biased rearwardly in home position via spring 194. The amount of sliding movement is limited by slot 193a and pivot guide 193b. The switch is provided with notches 195, 196 and has an upwardly extending ledge 197 for cooperation with lever arm 191, the ledge serving as a reaction means so that as tube 175 rotates and lever arm 191 bears against the ledge the switch is caused to swivel to one side causing tube extension 190 to move into notch 196, spring 194 then causing switch 192 to retract to the limit of notch 196. The switch contains actuating means, not shown, similar to means 122 and 123 on switch 121 shown in FIGS. 14 to 16 which engage corresponding micro switches such as 112, 116 shown in the circuit diagram of FIG. 13. The tube during rotation, in going from notch 195 to 196, indexes its side opening 187 with port opening 188 whereby pressure build-up over the water starts pushing water through opening 198 into the tube and out through passageway 189. When extension 190 reaches notch 196 and switch 192 moves to the left, the steam generator is actuated and the main heater 199 is shut off. Steam is rapidly formed to augment the pressure in the vessel. As the flow tube further rotates, lever 191 continues to bear against ledge 197 to cause switch 192 to pivot further to the right until extension 190 is released from the notch. The switch then retracts to home position as limited by slot 193a, with extension 190 then resting against shoulder 200. To reset the switch in a succeeding coffee-making operation, switch 192 is pushed forward from end 201 until tube extension 190 enters notch 195 by camming past surface 202.

As it is important that pressure build-up be avoided in the water-heating vessel during the initial stage of heating, the flow-through tube is provided with another opening 203 which is indexible with passageway 204 in closure element 186 during the early stage of heating. Thus, any gases or vapors formed at the early stage passes out through the atmosphere until the tube has begun to rotate sufficiently to move opening 203 out of indexing position, whereby the water in the vessel is sealed from the atmosphere. Pressure starts to build up as opening 187 moves into indexing position with port opening 188 such that the water is caused to be pushed through flow-through tube 175, out of the vessel and into the coffee infusion chamber.

It will be apparent from the foregoing, that the expression movably mounted flow-through tube is meant to cover those situations where the tube is caused to move upwardly starting with a substantially flat linear bi-metal thermostatic element or it may be caused to rotate by another form of bi-metal element, such as one configurated in the shape of a spiral.

As is apparent, the invention provides, as one embodiment, an improved water-heating vessel including closure means having a passageway therein through which heated water is withdrawn from the vessel. In addition, a port is provided communicating with the passageway. At least one heating means is disposed in heat-transfer relationship with the vessel, a movably mounted flow-through tube being supported within the vessel extending from the bottom thereof to the port in the closure element. The lower portion of the flow-through tube has an opening communicating with the interior of the vessel, the tube having coupled thereto a thermostatically-operable actuating means for moving the tube in cooperable and sealing relationship with the port when a predetermined temperature has been reached in the vessel, whereby the water in the vessel is sealed off so that pressure occurring prior to and at the predetermined temperature causes the water to flow through the tube, through the port and out through the passageway of the closure element.

The foregoing water-heating vessel is particularly applicable to a coffee maker wherein the water-heating vessel is employed in combination with a coffee infusion chamber which is coupled by a bridge in communication with the passageway of the closure means of the vessel. When employing the water-heating vessel in a coffee-making system, control means including a control circuit and an indexed switch are provided for controlling the heating means, the flow-through tube having means thereon which cooperate with the switch for interrupting the heating means when the thermostatically-operable flow-through tube has moved a predetermined amount corresponding to a predetermined water temperature.

In addition to the heating means which is preferably an electric heater, I may also include an electrically operable steam generating compartment or chamber disposed within the vessel and extending above the water level in the vessel whereby steam generated is passed directly to above the water level while minimizing heat transfer to the water in the vessel. In a preferred embodiment, the steam compartment or chamber is provided with an orifice for receiving a predetermined amount of water from the water in the vessel. In utilizing the steam generating compartment which is coupled to the same control circuit, the aforementioned control switch may have means which cooperate with means on the thermostatically operable flow-through tube for sequentially controlling the heating cycle, such that when the thermostatically-operable flow-through tube has moved a predetermined amount, the water-heating means is interrupted and the steam generating compartment is actuated until the flow-through tube has moved an additional amount, following which the steam generating means is cut off.

Where it is desirable, the flow-through tube may be stationarily mounted within the vessel and have means cooperably a part of the vessel to enable heated water in the vessel to be drawn off under pressure through the tube. As in the previous embodiments, the space above the water is maintained at atmospheric pressure during the initial stage of heating. This is done by providing an opening in the vessel which is closable by valve means similarly actuated by a thermostatically operable element, such as a bi-metal. When the temperature of the water and the vapor above it reaches say 195° F., the valve means closes off the opening and the main heater shut off by means of the movement of the valve means which cooperate with switch means coupled thereto as in the case of the movably mounted flow-through tube. The stationary flow-through tube is in communication with the water and as pressure builds up, water is forced through the tube, through means forming a part of the vessel and into the infusion chamber.

The foregoing embodiment is illustrated in FIG. 22 which shows a water-heating vessel 205 having a flow-through tube 207 supported therein via bushing means 208 at the upper portion 206 of the vessel which has a stopper 210 therein. The flow-through tube extends through the top of the vessel and communicates with infusion chamber 209 as shown. A bi-metal port-contacting means or valve 216 is provided supported as a movable cantilever, the valve portion of which is adapted to extend into a port in the vessel as shown. As the bi-metal heats up, its valve end moves so that it makes sealing contact with the opening, whereupon pressure build-up over the surface of the liquid causes the liquid to be pushed through tube 207 and into infusion chamber 209.

In FIG. 23, water heating vessel 211 is constructed so that water may be fed to an infusion chamber 215 located directly below the bottom of the vessel. The flow-through tube comprises two elements 213 and 214, one telescoped within the other, element 214 being a closed end tube inverted over inner tube 213, such that water flows up the annulus between the two elements and out through the center element or tube 213 into infusion chamber 215 when pressure develops above the liquid. The vessel has an upper portion 212 having a stopper 210 and a bi-metal port-contacting means 216 supported as a movable cantilever as in FIG. 22, the end of the cantilever having a valve means which may move into sealing contact with the port in the top of the vessel.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. An improved water-heating vessel including closure means having a passageway therein through which heated water is withdrawn from the vessel, a port communicating with said passageway, heating means disposed in heat-transfer relationship with said vessel, a movably mounted flow-through tube supported within said vessel extending from the bottom thereof to the port, the lower portion of said flow-through tube having an opening communicating with the interior of the vessel, and thermostatically operable actuating means coupled to said flow-through tube for moving said tube into cooperable relationship with said port at a predetermined temperature, whereby space above the water in said vessel is sealed off so that pressure build-up therein during heating causes water at a predetermined temperature to flow through the tube, through the port and out through the passageway of the closure element.

2. The improved water-heating vessel of claim 1 wherein the flow-through tube is supported to move upwardly in response to the thermostatically operable actuating means.

3. In a coffee maker comprising a water-heating vessel and a coffee infusion chamber coupled thereto, an improved water-heating vessel including closure means having a passageway therein through which heated water is withdrawn from the vessel, a port communicating with said passageway, heating means disposed in heat-transfer relationship with said vessel, a movably mounted flow-through tube supported within said vessel extending from the bottom thereof, the lower portion of said flow-through tube having an opening communicating with the interior of the vessel, and thermostatically operable actuating means coupled to said flow-through tube for moving said tube into cooperable relationship with said port at a predetermined temperature, whereby space above the water in said vessel is sealed off so that pressure buildup therein during heating causes water at a predetermined temperature to flow through the tube, through the port and out through the passageway of the closure element into the coffee infusion chamber.

4. The coffee maker of claim 3 wherein the flow-through tube is supported to move upwardly in response to the thermostatically operable actuating means.

5. The coffee maker of claim 4 including control means for controlling said heating means and means on said flow-through tube which cooperate with said control means for interrupting said heating means when the thermostatically operable flow-through tube has moved a predetermined amount corresponding to a predetermined water temperature.

6. The coffee maker of claim 4 wherein the heating means comprises at least one electric heater coupled to a control circuit having switch means and wherein said flow-through tube has means which cooperate with means on said switch means for interrupting said heating means when the thermostatically operable flow-through tube has moved a predetermined amount corresponding to a predetermined water temperature.

7. The coffee maker of claim 6 wherein in addition to said at least one electric heater an electrically operable steam generator is provided coupled to said control circuit comprising a small chamber with an associated electric heater disposed within said vessel which extends above the water level in said vessel whereby steam generated is passed directly to above the water level while minimizing heat transfer to the water in the vessel, an orifice in said steam chamber for receiving therein a predetermined amount of water from the water in the vessel and means on said control switch means cooperable with means on said thermostatically operable flow-through tube for sequentially controlling the heating cycle, such that when the thermostatically operable flow-through tube has moved a predetermined amount, the water heating means is interrupted and the steam generator is actuated, and such that when the flow-through tube has moved an additional amount the steam generator heating means is disconnected.

8. The coffee maker of claim 3 wherein a water filter is disposed in the path of flow between the water-heating vessel and the coffee infusion chamber.

9. The coffee maker of claim 8 wherein said water filter comprises a plurality of porous layers of fibrous material and comprises at least one layer of activated carbon.

10. A coffee maker comprising in combination, a water-heating vessel and a coffee receiver, said vessel having an opening at one end, a closure element sealingly connectable to said opening and having a passageway through which heated water may be withdrawn from the vessel, an infusion chamber having a coffee basket, a passageway in said infusion chamber, means communicating the passageway of the infusion chamber with the passageway of the hot water closure element, a port disposed inwardly of said closure element, said port communicating with the passageway of the closure element, at least one electric heating means located in heat-transfer relationship with said vessel, a movably mounted flow-through tube supported within said vessel extending from the bottom of the vessel to the port in said closure element, the lower portion of said flow-through tube having an opening communicating with the interior of the vessel, thermostatically operable actuating means coupled to said flow-through tube for moving said tube in cooperable relationship with said port at a predetermined temperature, whereby space above the water in said vessel is sealed off so that pressure build-up therein during heating causes water at a predetermined temperature to flow through the tube, through the port and out through the passageway of the closure element into the infusion chamber, electric heating means for said coffee receiver, an electric circuit coupled to the water-heating means and to the coffee heating means, a thermostatically controllable cut-off means coupled to said coffee heating means, an actuating switch including indexing means coupled to said electric circuit, said switch being biased in the off position, and means on said thermostatically operable flow-through tube for cooperating with the indexing means on said switch, such that when the switch is actuated, the switch is coupled to said thermostatically operable flow-through tube so that when the flow-through tube moves a predetermined amount, the switch is actuated through cooperation of its indexing means with means on said flow-through tube whereby to interrupt said heating means.

11. The coffee maker of claim 10 wherein the flow-through tube is supported to move upwardly in response to the thermostatically operable actuating means.

12. The coffee maker of claim 11 wherein in addition to said at least one electric heater an electrically operable steam generator is provided coupled to said control circuit comprising a small chamber with an associated electric heater disposed within said vessel which extends above the water level in said vessel, whereby steam generated is passed directly to above the water level while minimizing heat transfer to the water in the vessel, and an orifice in said steam chamber for receiving a predetermined amount of water from the water in the vessel, the indexing means on said control switch being arranged to cooperate with means on said thermostatically operable flow-through tube to sequentially control the heating cycle, such that when the thermostatically operable flow-through tube has moved a predetermined amount, the water heating means is interrupted and the steam generator is actuated, and such that when the flow-through tube has moved an additional amount, the steam generator heating means is disconnected.

13. The coffee maker of claim 10 wherein a water filter is disposed above said coffee basket, wherein an air trap is provided between the water filter and said coffee basket and wherein said basket has coffee filter means disposed at the bottom thereof.

14. The coffee maker of claim 13 wherein the water filter comprises a plurality of porous layers of fibrous material, at least one layer of activated carbon between said layers, and a fine mesh screen support at the bottom of said filter.

15. A coffee maker comprising in combination, a pedestal, a water-heating vessel and a coffee receiver supported by said pedestal, said vessel having a closed bottom at one end and an opening at the other end, a closure element sealingly connectable to said opening and having a passageway through which heated water may be withdrawn from the vessel, an infusion chamber having a coffee basket, coffee filter means disposed at the bottom of said basket, a sieve disposed across the entrance to said coffee basket having an air trap above it, water filter means disposed over said basket above the air trap, a passageway coupled to said infusion chamber, means communicating the passageway of the infusion chamber with the passageway of the hot water closure element, a port located inwardly of said closure element, said port communicating with the passageway of the closure element, at least one electric heating means located in heat-transfer relationship with said vessel, an upwardly movable flow-through tube supported within said vessel extending from the bottom of the vessel to the port in said closure element, the bottom of said flow-through tube having an opening with the interior of the vessel, thermostatically operable actuating means coupled to said flow-through tube for moving said tube in the upwardly direction in sealing contact with said port at a predetermined temperature, whereby space above the water in said vessel is sealed off so that pressure build-up therein during heating causes water at a predetermined temperature to flow through the tube, through the port and out through the passageway of the closure element, heating means on said pedestal for use with said coffee receiver, an electric circuit coupled to the water-heating means and to the coffee heating means, a thermostatically controllable cut-off means coupled to said coffee heating means, an actuating switch including indexing means coupled to said pedestal in cooperable relation with said electric circuit, said switch being biased in the off position, and means on said thermostatically operable flow-through tube for cooperating with the indexing means on said switch, such that when the switch is actuated, the switch is coupled to said thermostatically operable flow-through tube so that when the flow-through tube moves a predetermined amount, the switch is actuated through cooperation of its indexing means with means on said flow-through tube whereby to interrupt said heating means.

16. The coffee maker of claim 15 wherein in addition to said at least one electric heater an electrically operable steam generator is provided coupled to said control circuit comprising a small chamber with an associated electric heater disposed within said vessel which extends above the water level in said vessel, whereby steam generated is passed directly to above the water level while minimizing heat transfer to the water in the vessel, and an orifice in said steam chamber for receiving a predetermined amount of water from the water in the vessel, the indexing means on said control switch being arranged to cooperate with means on said thermostatically operable flow-through tube to sequentially control the heating cycle, such that when the thermostatically operable flow-through tube has moved a predetermined amount, the water heating means is interrupted and the steam generator is actuated and such that when the flow-through tube has moved an additional amount, the steam generator heating means is disconnected.

17. A coffee maker comprising: a base member; a closable water-heating vessel mounted on the base member, including a closure element therefor; a coffee infusion chamber exterior of the water-heating vessel and spaced above the base member; water flow-through means extending from adjacent the lower end of the water-heating vessel up to at least the top of the coffee infusion chamber; venting means for venting the upper part of said water-heating vessel to atmosphere; and temperature-responsive means cooperably associated with said venting means operative while water is below 212° F. to close the venting means, whereby once the temperature responsive means closes the venting means, pressure build-up in the water-heating vessel drives the water up the water flow-through means and to the coffee infusion chamber.

18. The coffee maker of claim 17 wherein a steam generator is provided wtihin said water-heating vessel comprising a steam generating chamber within and adjacent the bottom of said vessel and having a steam discharge tube extending to above the water level in said vessel.

19. A coffee maker comprising a closed water-heating vessel and a coffee infusion chamber, passage means connecting the lower portion of said water-heating vessel to said infusion chamber, air vent means for said heating vessel, closing means to close said air vent means when the temperature adjacent said closing means reaches a preset level, heating means for the water-heating vessel, means partially segregating off a lower portion of said water-heating vessel, and conduit means for conducting steam from said portion up to the upper portion of said vessel adjacent the closing means to raise the temperature there and thereby activate said closing means and bring up the gas pressure above such water to drive the heated water through the conduit means to the infusion chamber.

References Cited

UNITED STATES PATENTS

| | | | |
|---|---|---|---|
| 1,830,664 | 11/1931 | Kracklauer | 99—286 |
| 2,263,610 | 11/1941 | Cain | 99—286 X |
| 2,328,381 | 8/1943 | Jaffe | 99—286 |
| 2,371,328 | 3/1945 | Herrera | 99—282 |
| 2,575,777 | 11/1951 | Wilcox | 99—281 |
| 2,881,692 | 4/1959 | Volcov | 99—302 X |
| 3,218,956 | 11/1965 | Monticelli | 99—302 |

FOREIGN PATENTS

| | | |
|---|---|---|
| 717,909 | 10/1931 | France. |
| 658,126 | 3/1938 | Germany. |

WILLIAM I. PRICE, *Primary Examiner.*